UNITED STATES PATENT OFFICE.

HENRY V. DUNHAM, OF BRATTLEBORO, VERMONT.

MEDICINAL-OIL PREPARATION.

1,302,487.                Specification of Letters Patent.    Patented Apr. 29, 1919.

No Drawing.        Application filed September 4, 1918.   Serial No. 252,592.

*To all whom it may concern:*

Be it known that I, HENRY V. DUNHAM, a citizen of the United States of America, residing at Brattleboro, in the county of Windham and State of Vermont, have invented certain new and useful Improvements in Medicinal-Oil Preparations, of which the following is a specification.

The present invention relates to the production of mixtures containing medicinal oils, in a solid stable condition, in which the taste of the oil is largely masked by the other ingredients present, and in which the oil is in an attenuated finely divided condition, the product containing the oil in such a condition that upon mixing the product with water at ordinary temperatures the entire mixture completely emulsifies, producing a thorough mixture or emulsion which is stable under ordinary conditions for a reasonable length of time, whereby the oil is readily assimilable in the human digestive system. The invention embraces both the process and the product thereof.

In carrying out the process forming one of the objects of this invention, I prepare a relatively concentrated solution of a proteid body and add thereto a suitable quantity of the oil which is to be employed, agitate the mixture sufficiently to produce an emulsion containing the oil in a finely divided condition, which emulsion I then pass through a suitable homogenizer, or otherwise treat the mixture to produce a completely homogeneous mixture of the solution of albuminous material and the oil, which mixture can be allowed to stand for a long time without separation of material amounts of oil. This mixture is then dried under suitable conditions to preserve its ready solubility, after which the dried material may be pulverized.

In the dry condition the product will keep for long periods of time without deterioration, and the product can subsequently be mixed with water, for example, at ordinary temperature to produce a rather permanent emulsion without the separation of any of the oil.

As examples of oily material to be employed, I mention castor oil and cod liver oil, which are examples of fatty oils, which are extensively used in medicines, but which oils are not always readily assimilated by the digestive organs of humans, particularly invalids, whose digestive system is relatively weak, and also I mention paraffinum liquidum, which oil can be treated in accordance with the present process. As the preferred albuminous material to employ, casein treated as described below is by far the most suitable, as when using this material I can employ an amount of oil which will constitute up to two-thirds, or even slightly more, of the total weight of the finished product. Another fairly suitable albuminous material is egg, which may be employed either as raw egg, egg white, egg yolk or dried egg redissolved. In some instances, as where only a relatively small amount of oil is to be incorporated, concentrated milk or milk powder mixed with water may be employed.

As a specific example of the process, to which the invention is not limited, I give the following: 100 parts of casein are dissolved in water, (containing a little alkali, *e. g.*, $NaHCO_3$) and to this solution is added 100 parts of cod liver oil. The mixture is then violently agitated in order to emulsify the oil in the casein solution, and the mixture is then passed through a homogenizer under pressure in the well known way in order to produce a completely homogeneous liquid mass. This mass is then dried in any suitable manner, for example, in a vacuum drier, and the resulting mixture is pulverized. The resulting product may contain about 50% of casein and 50% of cod liver oil. The mixture, when stirred up with cold water, forms a relatively stable emulsion, which can stand for several hours without separation of oil.

At the time of producing the original emulsion of the cod liver oil and casein solution a small amount of a flavoring material, such as oil of cinnamon, can be added. It is also to be understood that other medicinal agents can be added to the solution if desired, for example, salts, active principles of plants, enzyms, and the like or flavoring agents, or agents capable of covering up the odor or taste of the oil. With cod liver oil particularly suitable medicinal materials are phosphate and hypophosphites.

It is to be understood that the maximum temperature employed in the drying operation depends upon the particular materials under treatment, particularly the kind of albuminous material employed. This is especially important in connection with the use of eggs or egg white as the emulsifying liquid. The temperature must not be so high as to injure the albuminous material or to decrease its solubility.

The proportions employed can be widely varied, thus I may use from a proportion of three parts of casein to one of oil, up to one part of casein to two or even more parts of oil.

In producing the original solution of albuminous material in which to emulsify the oil, the best practice is to add a sufficient amount of albuminous material to produce a relatively concentrated and relatively viscous solution. For this purpose a neutral or very slightly alkaline solution of casein of about 20% strength is suitable.

The production of edible materials generally, by the employment of edible fatty oils instead of medicinal oils, is not broadly claimed herein but in my copending application No. 261,800 filed November 9, 1918.

I claim:

1. As an article of manufacture, a light, dry, relatively finely divided intimate mixture comprising an albuminous material and an ingestible medicinal oil, said oil being disseminated in a finely divided state throughout the mixture to be largely masked therein, said albuminous material being present in sufficient quantity to produce, upon mixing the product with water, an intimate, practically stable emulsion, largely free from strong oily taste or odor.

2. A process which comprises emulsifying an ingestible medicinal oil in a solution of a water-soluble albuminous material such solution having a greater concentration as to albuminous material than has ordinary milk, the amount of oil being not less than about one-half of the amount of such albuminous material in the solution, homogenizing the emulsion and drying the product.

3. A process which comprises emulsifying an ingestible medicinal oil in a viscous casein solution, homogenizing the emulsion and drying the product.

4. As a new article of manufacture a light dry relatively finely divided intimate mixture comprising casein and an ingestible medicinal oil, said oil being disseminated in a finely divided state throughout the mixture to be largely masked therein, said casein being present in sufficient quantity to produce upon mixing the product with water an intimate practically stable emulsion, largely free from strong taste or odor.

In testimony whereof I affix my signature.

HENRY V. DUNHAM.